United States Patent
Lebow

[11] 3,888,564
[45] June 10, 1975

[54] VIEWING SYSTEM PROVIDING COMPATABILITY BETWEEN TWO DIMENSIONAL PICTURES AND THREE DIMENSIONAL VIEWING THEREOF

[76] Inventor: Marvin E. Lebow, 3431 E. 62 Pl., Tulsa, Okla. 74136

[22] Filed: Oct. 11, 1973

[21] Appl. No.: 405,392

[52] U.S. Cl. .................. 350/138; 40/106.1; 353/7
[51] Int. Cl. .......................................... G02b 27/24
[58] Field of Search.................. 350/138, 144, 137; 40/63 A, 64 A, 106.1; 353/7, 10

[56] References Cited
UNITED STATES PATENTS
1,579,025  3/1926  Owens .......................... 350/138 X Primary Examiner—Paul A. Sacher

[57] ABSTRACT

A viewing system in combination with a picture particularly designed for use in both two dimensional and three dimensional viewing, said two dimensional picture comprising right eye and left eye images mounted back to back and being of a standard or conventional representation when viewed in the usual or normal two dimensional manner as in a frame, or the like, and having a reversed representation on the opposite side or face thereof disposed in substantial alignment with the conventional view whereby said two dimensional picture may be readily disposed within a novel stereoscopic type viewer for three dimensional viewing thereof.

7 Claims, 2 Drawing Figures

PATENTED JUN 10 1975 3,888,564

VIEWING SYSTEM PROVIDING COMPATABILITY BETWEEN TWO DIMENSIONAL PICTURES AND THREE DIMENSIONAL VIEWING THEREOF

BACKGROUND OF THE INVENTION

1. Field of the Invention

This invention relates to improvements in viewing systems and devices and more particularly but not by way of limitation to a viewing system providing compatability between two dimensional pictures and three dimensional viewing thereof.

2. Description of Prior Act

There have been many three dimensional viewers of the stereoscopic type wherein a pair of matched left and right eye images or pictures may be viewed simultaneously to simulate three dimensions. Many of these devices are so arranged whereby the matched pictures or images are mounted in a common carrier member in side by side relation whereby the right eye image is viewed by the right eye of the beholder and the left eye image is viewed by the left eye. As a result the pictures themselves may be satisfactorily viewed in three dimension only. That is, from an aesthetic aspect, the picture cannot be viewed in the usual two dimensional manner by being mounted in a frame or the like without destroying or damaging the dual mounting arrangement. One three dimensional viewer or viewing apparatus for viewing pictures or images mounted in back to back relation instead of side by side relation has been developed as shown by the F. H. Owens U.S. Pat. No. 1,579,025, issued Mar. 30, 1926, and titled "Stereoscopic Apparatus." However, it is noted that although there is one "right eye" and one "left eye" image in the Owens picture, both images are reversed or mirror images of a true representation and therefore cannot be satisfactorily viewed in the standard or usual two dimensional manner. As a result "favorite" pictures which would be desirable to mount in a frame, or the like, for substantially continuous viewing cannot be viewed in three dimensions and conversely favorite pictures which have been prepared for three dimensional viewing cannot be viewed in the more standard two dimensional manner.

SUMMARY OF THE INVENTION

The present invention contemplates a novel viewing system particularly designed and constructed for providing a compatability between two dimensional pictures and three dimensional viewing thereof. The novel system comprises a two dimensional picture having the usual straight forward or standard image on one side or face thereof representing, for example, a left eye image and a reversed image mounted on the opposite side or face thereof, representing, for example, a right eye image. The first or standard image of the picture may be viewed in the usual two dimensional manner and when it is desired to view the picture in a simulated three dimensional form the picture may be deposited or inserted substantially in the center of a novel viewer having an optic system provided therein for transmitting the image to the left and right eyes of the beholder in such a manner that the picture appears to be in three dimensions. The novel viewer and the picture are simple and efficient in use and economical and durable in construction.

DESCRIPTION OF A PREFERRED EMBODIMENT

Figure 1:
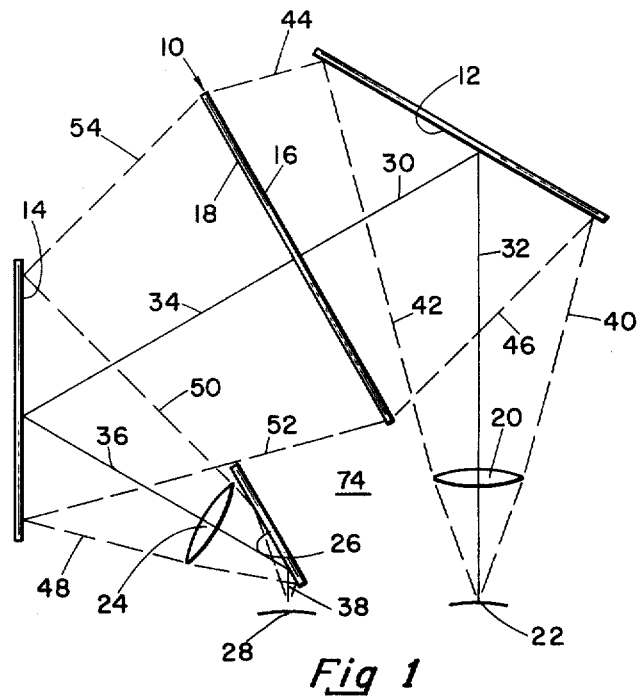
FIG. 1 is a schematic view of an optical viewing system embodying the invention with portions thereof depicted in broken lines for purposes of illustration.

Referring to the drawings in detail and particularly FIG. 1 a schematic representation of the optical system of the invention is shown wherein a picture generally indicated at 10 is interposed between a pair of reflecting surfaces 12 and 14 which may be in the form of mirrors, but not limited thereto. The picture 10 comprises a pair of back to back images 16 and 18 and the picture 10 is preferably fabricated by utilizing a conventional two dimensional copy of the left and right eye views of a common image and placing them back to back in the same plane but 180° apart. One image, such as the image 16, must be reversed or a mirror image with respect to the other image, such as the image 18. The reversed image 16 preferably comprises the back of the picture 10 whereas the front or properly orientated image 18 comprises the front side of the picture 10. Thus, when the picture 10 is to be viewed in the normal two dimensional manner, the picture 10 may be displayed with only the image 18 being visible. Both pictures or image 16 and 18 are of the same size having opposite or reversed orientation horizontally only, but with the same orientation vertically. The pictures or images 16 and 18 must be mounted in relation to each other so that they are in proper register with respect to geometry of the three dimensional viewing system as will be hereinafter set forth. In addition, it is preferable that the photoprint paper upon which the images 16 and 18 are printed should be of such quality that excessive grain does not show upon enlargement thereof.

The optical system of the invention comprises the reflecting surfaces or mirrors 12 and 14 spaced from and in proper angular orientation with respect to the plane of the respective image 16 and 18 whereby the mirror 12 receives the image 16 and reflects the image toward and through a suitable lens 20 and to a right eye piece 22. The mirror 14 receives the image 18 and reflects the image 18 to and through a suitable lens 24 for reflection by a reflective surface or mirror 26 which disposed in proper orientation with respect to the mirror 14 for reflecting the image from the lens 24 to left eye piece 28. The eye piece 22 permits viewing of the image 16 through the reflective surface or mirror 12 and lens 20. The reflective surface 12 reverts or reverses the image 16 to its original orientation corresponding to the normal or standard front image 18. The lens 20 is of any suitable type for magnifying and focusing the image properly for the eye piece 22 in any suitable or well known manner (not shown). The eye piece 28 permits viewing of the image 18 through the reflective surfaces or mirrors 14 and 26 and lens 24. The reflective surface 14 reverses the image 18 and the reflective surface 26 reverts the reversed image back to the proper or normal image orientation as originally provided by the image 18 and thus corresponds to the image 16 being received at the eye piece 22. Of course, the lens 24 may be of any suitable type for magnifying or focusing the image for the eye piece 28 as is well known. It is preferable that the lens 20 and lens 24 be of the same type, but not limited thereto.

The length of the path of the light or image travel from the image 16 to the eyepiece 22 and from the image 18 to the eye piece 28 may be calculated and constructed to be equal. Thus, both images 16 and 18 as viewed by the eye pieces 22 and 28 are not only of proper orientation with respect to each other but are equal in size and may be focused and enlarged by the lens 20 and lens 24 for facilitating the viewing thereof by the beholder.

The plane of the picture or image 16 is disposed substantially perpendicular to the line of sight for the eye piece 22 and similarily the plane of the picture or image 18 is substantially perpendicular to the line of sight for the eye piece 28. This centers the images 16 and 18 in the field of view of the respective eye pieces 22 and 28 and makes the images appear to the beholder as in the original scene of the picture. It will be readily apparant that the spacing, positioning and orientation of the reflective surfaces 12, 14 and 26 and the lens 20 and 24 may be varied in accordance with the picture size, the position of the picture, the angle and the focusing therefore. Of course a plurality of sizes of pictures and dimensions of photographs may be accommodated in a viewer of this type with the proper design thereof.

For purposes of illustration, the line of sight between the image 16 and the reflecting surface 12 is represented or indicated by the solid line 30, and the line of sight from the reflecting surface 12 through the lens 20 and to the eye 22 is represented by the solid line 32. Similarly, the line of sight between the image 18 and the reflecting surface 14 is represented by the solid line 34, and the line of sight between the reflecting surface 16 and 26 and through the lens 24 is represented by the solid line 36, and the line of sight from the reflecting surface 26 and the eye 28 is represented by the solid line 38. It is to be noted that the outer limits of the image 16 are preferably well clear of and to one side of the field of view of the eye 22, as represented by the broken lines 40–42 and 44–46. This permits a clear field of view of the reflecting surfaces or mirrors 12 and of the image 16 through the eye piece 22. On the other hand, it is to be noted that the image 18 is in the "apparent" field of view of the eye piece 28, as represented by the broken lines 48–50 and 52–54, but the actual physical position of the reflecting surface 26 blocks and masks the image 18 from direct view through the eye piece 28. However, the image 18 is reflected through the mirror or reflecting surface 14 and the reflecting surface 26, and is thus seen clearly and visibly in the reflecting surface 14 through the eye piece 28 as an unobstructed field of view for the eye of the beholder.

Interocular distance can be varied by varying the distance between the eyes of the beholder or the eyepieces 22 and 28. Small changes in the angle of the lines of sight may be made by relatively slight movement of the reflecting surfaces. Large changes of angle and distance may involve movement of several component parts of the system in order to maintain the proper related orientation or alignment and focus. The same geometry permits considerable variation for the system.

Figure 2:
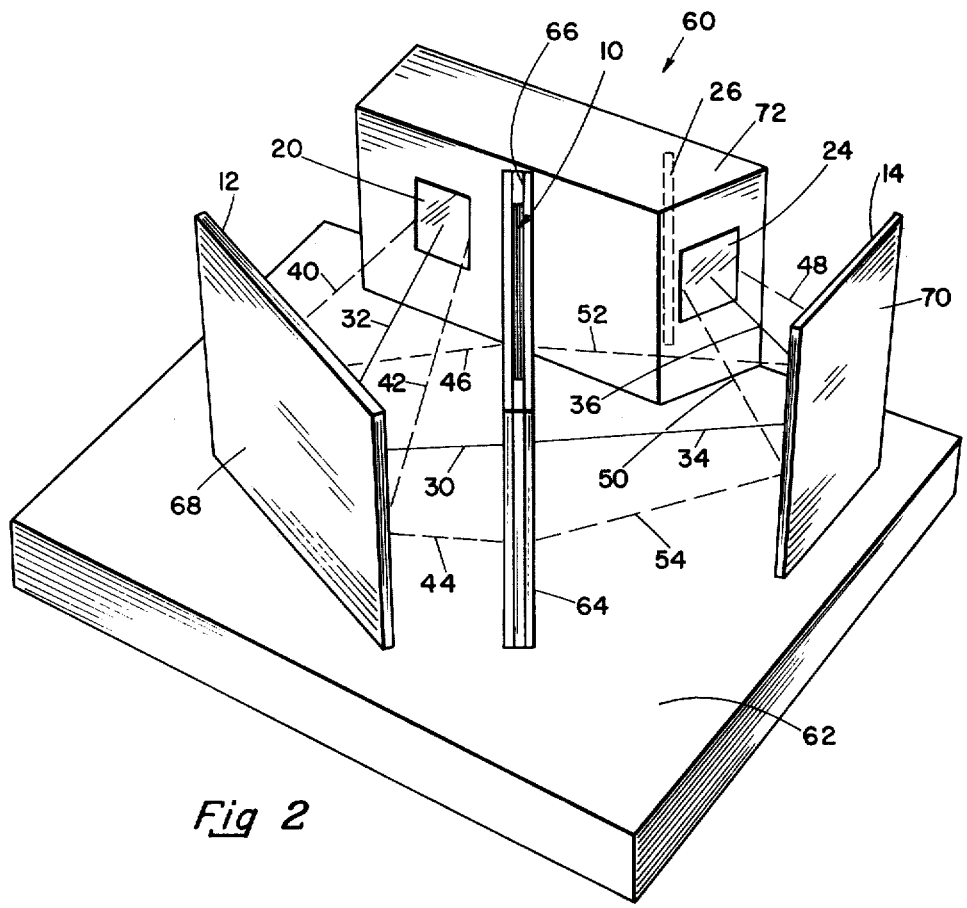
FIG. 2 is a perspective view of a viewing apparatus embodying the invention with portions depicted in broken lines for purposes of illustration.

Referring now to FIG. 2 reference numeral 60 generally indicates a viewing apparatus embodying the invention comprising a base member 62 having a picture receiving element 64 mounted thereon in any suitable manner (not shown) and extending perpendicularly therefrom. The picture receiving element 64 may be of substantially any desired configuration and is provided with a slot 66 at the outer end thereof for removably receiving the picture 10 therein. Suitable apertures (not shown) are provided on the opposite side of the picture support element 64 extending into communication with the slot 66 whereby both images 16 and 18 of the picture 10 are simultaneously visible when the picture 10 is disposed in the slot 66. A first wall 68 is mounted on the base 62 in any suitable manner and substantially perpendicular with respect thereto. The wall 68 is spaced from and at a particularly selected angular orientation with respect to the picture receiving element 64 for a purpose as will be hereinafter set forth. The inwardly directed surface of the wall 68 is provided with the reflective surface 12. A second wall 70 is suitably mounted on the platform 62 in any suitable manner and is substantially perpendicular with respect thereto. The wall 70 is spaced from the picture support element 64 and disposed at an angle with respect thereto as clearly shown in the drawings and for a purpose as will hereinafter set forth. The inwardly directed surface of the wall 70 is provided with a reflecting surface 14.

A housing 72 is also provided on the base 62 and is spaced from but interposed between the walls 68 and 70 whereby the lenses 20 and 24 and eye pieces 22 and 28 and reflective surface 26 may be mounted within the housing 72 in an orientation as hereinbefore set forth. Of course, a suitable outer casing, or the like, (not shown) may be provided for encompassing or enclosing the base 62, picture holding element 64, walls 68 and 70 and housing 72. A suitable opening, of course, may be provided in such an outer casing for permitting insertion of picture 10 into the picture receiving recess 66 as is well known. In the event an outer casing is provided for the apparatus 60 it may be desirable to provide suitable internal lighting for illumination (not shown) to facilitate viewing of the picture 10 as is well known. In the event no outer casing is provided for the apparatus 60, natural light or surrounding light may be utilized for viewing the picture 10.

From an inspection of FIG. 1 it will be apparent that the geometry of the optical system of the invention provides an area 74 extending inwardly between the eye pieces 22 and 28. This conveniently permits the provision of a recess (not shown) in the base member 62 and other physical structure of the apparatus 60 for accommodating the nose (not shown) of the beholder when his eyes (not shown) are disposed in the proximity of the eye pieces 22 and 28 for viewing the picture 10.

Of course the overall physical dimensions of the apparatus 60 may be selected in accordance with the desired size of the picture 10 with which the apparatus 60 is designed to be utilized. It is preferable that the overall size and weight of the apparatus 60 be convenient for facilitating manual handling and operation thereof. However, there is no physical limitation of the size of the apparatus 60 except as considered within the pratical limits for the actual use of the apparatus.

In use, the picture 10 may be viewed in the normal two dimensional manner as long as desired by placing the picture in a frame (not shown) or the like, wherein the normal image thereof only is visible. However, when it becomes desirable to view the picture 10 in a simulated three dimensional aspect, the picture may be quickly and easily inserted into the slot 66 whereby the apparatus 60 may be utilized for viewing the picture 10 in three dimensions. The walls 68 and 70 are properly angularly orientated with respect to the support 64 whereby the images 16 and 18 are reflected to the eye pieces 22 and 28 in the manner as described in connection with FIG. 1. As hereinbefore set forth, the left eye piece 28 views the picture in a coordinated relationship with the view seen through the right eye piece 22. As depicted herein the eye piece 28 permits viewing of the normal or standard version of the picture 10 by reversing the image 18 two times, whereas the eye piece 22 permits viewing the reverse image 16 as a normal image by reversing the image only once. Whereas, the particular version shown herein is a left eye version in that the left eye of the holder actually views the normal or standard image, it will be apparent that a right hand version may be similarly arranged wherein the right eye of the beholder actually views the normal or standard image.

From the foregoing it will be apparent that the present invention provides a novel viewing system permitting compatability between the standard or normal two dimensional picture and a simulated three dimensional viewing thereof. The novel system includes a picture having the usual or standard image on one face thereof and a reversed image on the rear face thereof. The image on one side of the picture is a right eye image whereas the image on the opposite side of the picture is a left hand image. The novel viewer provides a means for viewing of the opposite sides of the picture simultaneously in a manner similating a three dimensional viewing of the picture.

Whereas the present invention has been described in particular relation to the drawings attached hereto, it should be understood that other and further modifications, apart from these shown or suggested herein, may be made within the spirit and scope of this invention.

What is claimed is:

1. A method of providing compatibility between two dimensional pictures and three dimensional viewing thereof which consists of providing a left eye image and a right eye image of an identical scene, reversing one of said images with respect to the other, maintaining a normal image for the other of said images, securing said reversed image in aligned back to back relationship with said normal image whereby said normal image may be viewed in a standard two dimensional manner, providing a first sighting path for viewing of the left eye image by the left eye of a beholder, providing a second sighting path for viewing of the right eye image by the right eye of the beholder simultaneously with the left eye viewing whereby said images may be viewed in a simulated three dimensional manner.

2. A method as set forth in claim 1 wherein providing one of said sighting paths comprises the steps of reverting said reversed image to correspond with said normal image during the three dimensional viewing.

3. A method as set forth in claim 2 wherein providing of the other of said sighting paths comprises the steps of initially reversing said normal image, and subsequently reverting said reversed normal image to provide a second normal image during the three dimensional viewing.

4. In combination, a picture having a pair of right eye and left eye matched images disposed in aligned back to back relationship with one of said images being normal image and the other of said images being reversed image, and a three dimensional viewing apparatus comprising picture receiving means for supporting the picture for simultaneous viewing of both images thereof, first eye piece means, first reflector means interposed between the first eye piece means and the picture receiving means for transmitting said one image to the first eye piece and converting said one image to a normal image at the first eye piece means, second eye piece means spaced from the first eye piece means, second reflector means interposed between the second eye piece means and the picture receiving means for transmitting said other image to the second eye piece means and converting said other image to a normal image at the second eye piece whereby both images may be viewed simultaneously in simulated three dimensional viewing.

5. The combination as set forth in claim 4 wherein the first reflecting means comprises a reflecting element spaced from one image and angularly orientated with respect to the plane thereof, first lens means interposed between the reflecting element and said first eye piece for receiving the image from the reflecting surface and focusing the image for transmission to the first eye piece, and said second reflecting means comprises a first reflecting surface spaced from the said other image and angularly orientated with respect to the plane thereof, a second reflecting surface spaced from the first reflecting surface and angularly disposed with respect thereto for transmitting the said other image to the second eye piece means, and second lens means interposed between the first and second reflecting surfaces for enlarging and focusing said other image.

6. The combination as set forth in claim 4 wherein the normal image is the right eye image and the reversed image is the left eye image.

7. The combination as set forth in claim 4 wherein the normal image is the left eye image and the reversed image is the right eye image.

* * * * *